United States Patent [19]

Sansome et al.

[11] E Patent Number: Re. 31,698

[45] Reissued Date of Patent: Oct. 9, 1984

[54] LOAD-MEASURING DEVICES

[75] Inventors: Dennis H. Sansome, Sutton Coldfield; Gerald M. Jones, Trimpley, Near Bewdley both of England; Basily B. Basily, Cairo, Egypt

[73] Assignee: National Research Development Corporation, London, England

[21] Appl. No.: 435,992

[22] Filed: Oct. 21, 1982

Related U.S. Patent Documents

Reissue of:

[64] Patent No.: 4,285,234
Issued: Aug. 25, 1981
Appl. No.: 96,149
Filed: Nov. 20, 1979

[30] Foreign Application Priority Data

Nov. 23, 1978 [GB] United Kingdom ..... 45768/78

[51] Int. Cl.[3] ..... G01L 5/00
[52] U.S. Cl. ..... 73/862.65; 338/5
[58] Field of Search ..... 73/862.65, 862.63, 862.67, 73/766

[56] References Cited

U.S. PATENT DOCUMENTS

| | | | |
|---|---|---|---|
| 3,448,424 | 6/1969 | Laimins | 73/141 A |
| 3,636,760 | 1/1972 | Shoberg | 177/211 |
| 3,736,795 | 6/1973 | Andersson | 338/5 |
| 4,089,216 | 5/1978 | Elias | 73/862.65 |
| 4,162,628 | 7/1979 | Oetjen et al. | 73/141 A |
| 4,175,445 | 11/1979 | Templeton | 73/141 A |

FOREIGN PATENT DOCUMENTS

| | | | |
|---|---|---|---|
| 581394 | 11/1977 | U.S.S.R. | 338/5 |

*Primary Examiner*—Donald O. Woodiel
*Attorney, Agent, or Firm*—Cushman, Darby & Cushman

[57] ABSTRACT

A load-measuring device, comprising a ring to be interposed between two opposed bodies coaxial with the load axis. Circumferentially-spaced projections separate one axial face of the ring from one of the bodies, and similar but angularly-staggered projections separate the other axial face from the other body, so that when the bodies approach under load the ring is distorted to an undulating shape. The distortion may be measured by a set of strain gauges fixed to the axial faces of the ring, and the output of a second set of gauges fixed to the radial faces of the ring may serve to compensate for distortions of the ring caused by things other than axial thrust, e.g. temperature variation. The projections may be fixed to the ring, or fixed to and located by the ring casing so that they bear against the ring in use.

10 Claims, 6 Drawing Figures

LOAD-MEASURING DEVICES

Matter enclosed in heavy brackets [ ] appears in the original patent but forms no part of this reissue specification; matter printed in italics indicates the additions made by reissue.

This invention relates to load-measuring devices, and in particular to devices for measuring the loads set up in engineering equipment, for example in a rolling mill where the space available is limited. A load cell for such purposes is normally mounted as an element in the load circle in the suspension between the rolls and the housing of the apparatus, so that it is exposed to the full load and is elastically distorted thereby; strain gauges bonded to the body of the load cell respond to its deformation and the response of the gauges is processed to give a signal indicative of that load.

Three types of cell, in particular, are frequently encountered in laboratory or industrial apparatus. The first such type, commonly known as a "proving ring", is essentially a robust, short, hollow cylinder set up so that a diameter coincides with the load axis. The load therefore causes the cylinder to distort elastically from circle to oval or ellipse, and gauges fixed to the surfaces of the cylinder respond to the distortion of the surfaces. Another type comprises a hollow or solid cylinder mounted in a load circle with an axis coincident with the line of action of the load; application of a compressive load therefore, causes such a cell to shorten, and strain gauges which are bonded to a surface of the cylinder accordingly shorten and transduce appropriately.

The third type often comprises a hollow torus, mounted coaxial with the load so that application of the latter causes an elastic distortion of the cross-section of the torus.

The first such type of cell can give readings of great accuracy, but requires accurate installation and also appreciable space (a minimum length of a full diameter of the cylinder) in the direction of the load axis; in industrial installations, available space in this direction is often limited. For these reasons, such cells tend to be used as standards in laboratories rather than as engineering equipment in everyday use. The second type of cell just described requires less axial accommodation, but practice has clearly demonstrated that the cylinder must have an axial length of at least one diameter, and preferably 1.1 diameters or even greater, to minimise eccentric loading and inconsistent readings from strain gauges subject to non-uniform stress fields. The third, toroidal load cell is of course much more compact axially, but suffers from the disadvantage that useful readings from it require strain gauges to be bonded both to the radially-outer and to the radially-inner surface and these are not readily inter-linked in one circuit. The inner surface is of course relatively inaccessible when the transducer is assembled, and therefore wiring and connection of strain gauges attached to it requires holes to be drilled through the ring, or other difficult or undesirable expedients. Also, special saddles interposed between the ring and adjacent items of the load circle may restrain the distortion, leading to non-linearity, and such saddles of course add to the axial length required by the transducer. Finally it is impossible to produce an accurate hollow torus with uniformly consistent properties around its periphery and this design is therefore fundamentally unsatisfactory when accurate measurement of force and alignment is required.

When subject to a compressive force, the load cell of our invention undergoes a form of elastic deformation quite different from that of any of the three known kinds just described, and it requires even less axial space than the torus type (even without saddles). It is very accurately machinable, and is easy to set up. Our invention comprises a load-measuring device of ring-like form for interposition between two members to respond to the force acting upon it, in which at least three circumferentially-spaced axial projections bear against one axial face of the ring and at least three like projections bear against the opposite axial face of the ring in like fashion, and in which the projections against one face are staggered relative to those against the other, whereby when the ring is interposed between the two members under load those members bear respectively against the tips of the two sets of axial projections and the ring distorts elastically to an undulating shape when viewed in a radial direction. A first set of gauges is mounted on the ring to measure the predominantly tensile bending strains, whereby an indication of the applied load may be derived from the signals of these gauges.

The axial projections may be bonded to the ring, or may be integral with it, and may be sector-shaped. Alternatively the projections may be mounted on and located by other parts of the device so that they bear against the ring when those other parts are assembled. The other parts may for instance be the two halves of a casing that also serves to enclose and protect the ring.

The first set of gauges may be bonded to the ring in such a manner that each of these gauges is mounted on an axial face of the ring at a point axially-opposite to where a projection bears against the other axial face of the ring. There may also be a second set of gauges, attached to the radially-inner and radially-outer faces of the ring at locations circumferentially-staggered relative to those of the projections.

The gauges may be of electrical resistance type so that the "signal" of a gauge when it responds to the deformation of the surface to which it is bonded corresponds to a change in its resistance. The gauges may be arranged in a bridge-type electrical circuit, the output of which provides an indication of the applied load, and while usually the resistances of the first set of gauges contribute directly to this output the gauges of the second set commonly may play a more passive role, compensating only for temperature variations and any distortions of the ring other than those caused by axial thrust.

The invention will now be described by way of example with reference to the accompanying drawings in which.

Figure 1:
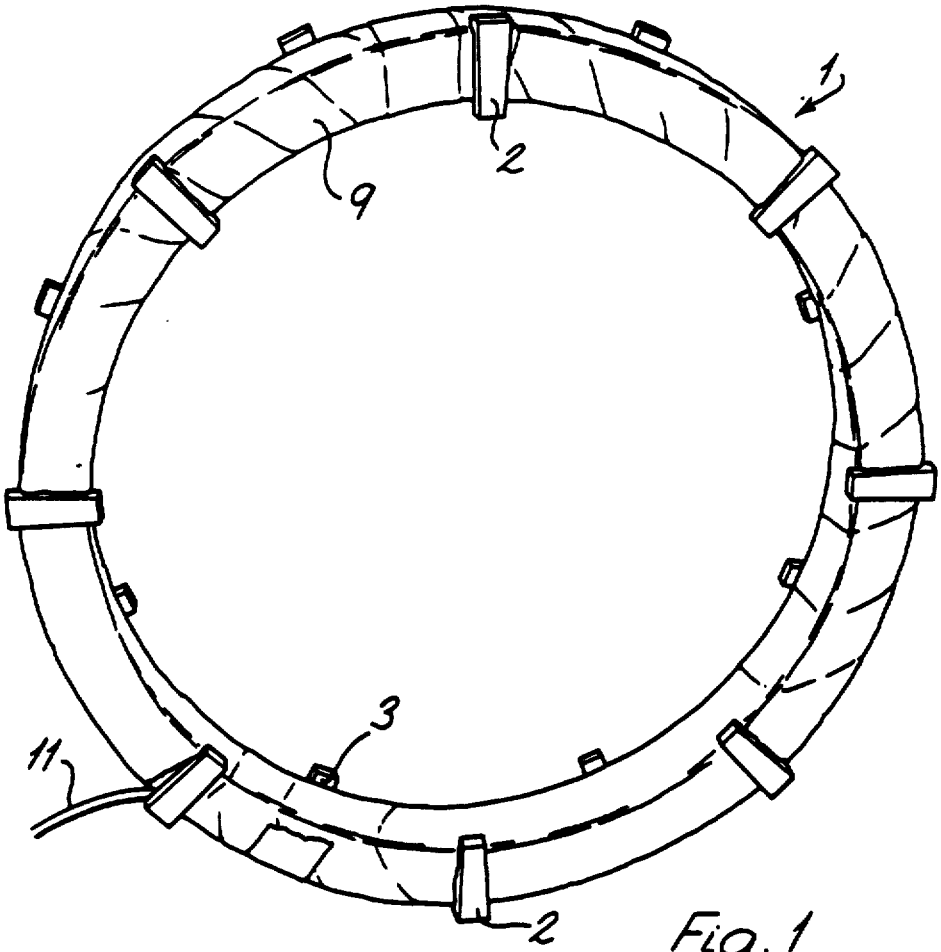
FIG. 1 is a perspective view of the essential elements of a load cell.
Figure 2:
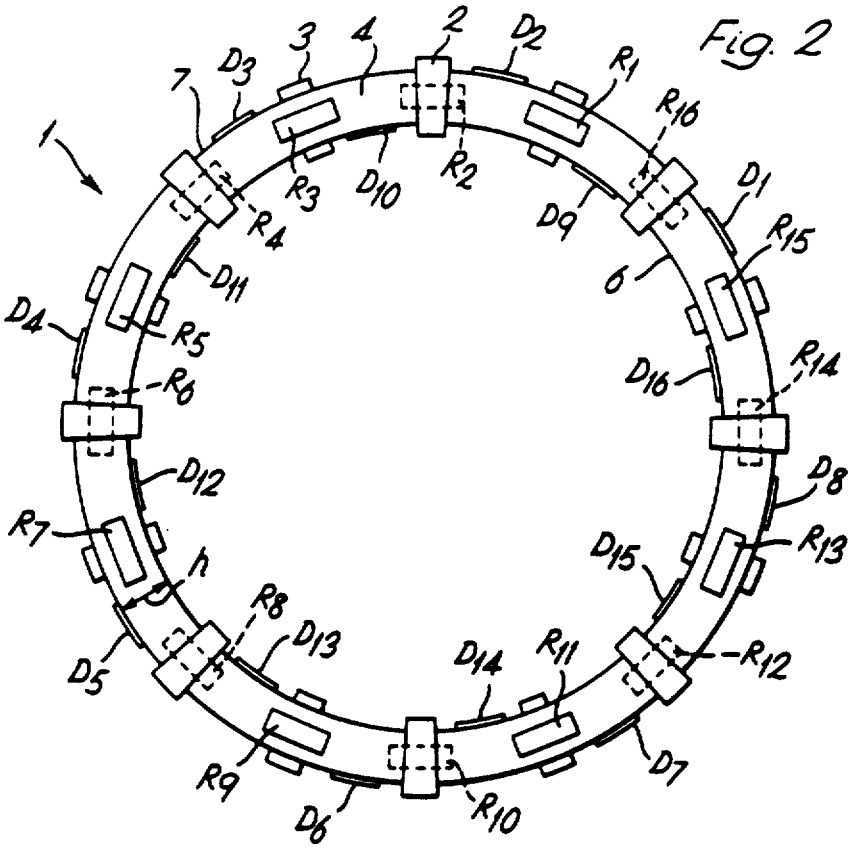
FIG. 2 is a diagrammatic plan view of the load cell of FIG. 1, showing the relative positions of sector-shaped supports and gauges.

The load cell of FIGS. 1 and 2 comprises a ring 1 with sets of part-sector-shaped projections 2, 3 mounted on opposite faces 4 and 5 of the ring respectively, the whole being manufactured in one piece by turning, milling and accurately grinding a bar of softened EN 24 steel appropriately heat-treated. Faces 4 and 5 will be referred to as axial faces since their surfaces face in an axial direction; that is to say, a line drawn normal to either face will lie parallel to the axis of ring 1. Similarly projections 2 and 3 will be referred to as axial projections since they project proud of faces 4 and 5 in an axial sense. Projections 2 and 3 are each eight in number and equispaced around the ring but the two sets of projections are circumferentially staggered relative to each other. If the ring is interposed between opposed flat, parallel faces of two members of a load-transmitting linkage, it will easily be appreciated that the opposed axial forces of one member against the tips of projections 2 and of the other member against the tips of projections 3 will distort the ring so that its rim presents a wavy appearance to an observer who passes around the outside of the ring, looking inwards towards the ring centre. The ring is designed so that such distortion remains elastic and reversible and in one load cell as illustrated, designed to withstand and measure an axial thrust of up to 20 tonf, the rectangular cross-section of the ring was 1" in the radial dimension and ⅜" in thickness and the mean diameter of the ring was 8½". Each projection (2, 3) projected an axial distance of 1/16" from the axial face (4, 5) on which it was mounted, and the radial length and mean width of each projection, when viewed in plan, were 15/16" and ⅜" respectively.

In the example of the invention just described, the projections 2 and 3 are integral with the ring 1. Alternatively the projections could have been separate from the ring, but fixed to it by bonding or in other suitable ways. In the alternative construction according to the invention shown in FIG. 6, ring 20 is a simple annulus and the projections 2 and 3, of which only one is shown by way of example, bear against the ring's upper and lower axial faces 21, 22 respectively during use but are located and mounted in section-shaped slots 23, 24 formed in the flat surfaces 25, 26 of casing members 27, 28. The cylindrical flange 29 of member 27 is of greater diameter than the corresponding flange 30 of member 28, so that the two members can fit together in a manner similar to that in which the pushfit lid of a common cylindrical container fits over the base. When members 27, 28 are thus fitted together, they form an annular casing which serves to enclose and protect ring 20, as well as provide mountings for the projections 2 and 3. Correct angular alignment of ring 20 and members 27, 28 to ensure that the points where projections 2 bear against face 21 of ring 20 are angularly staggered relative to the points where projections 3 bear against face 20 are ensured by keys 31, 32 which are mounted on wall 30 of member 28, and which engage with slots 33, 34 on ring 20 and member 27 respectively.

Figure 6:
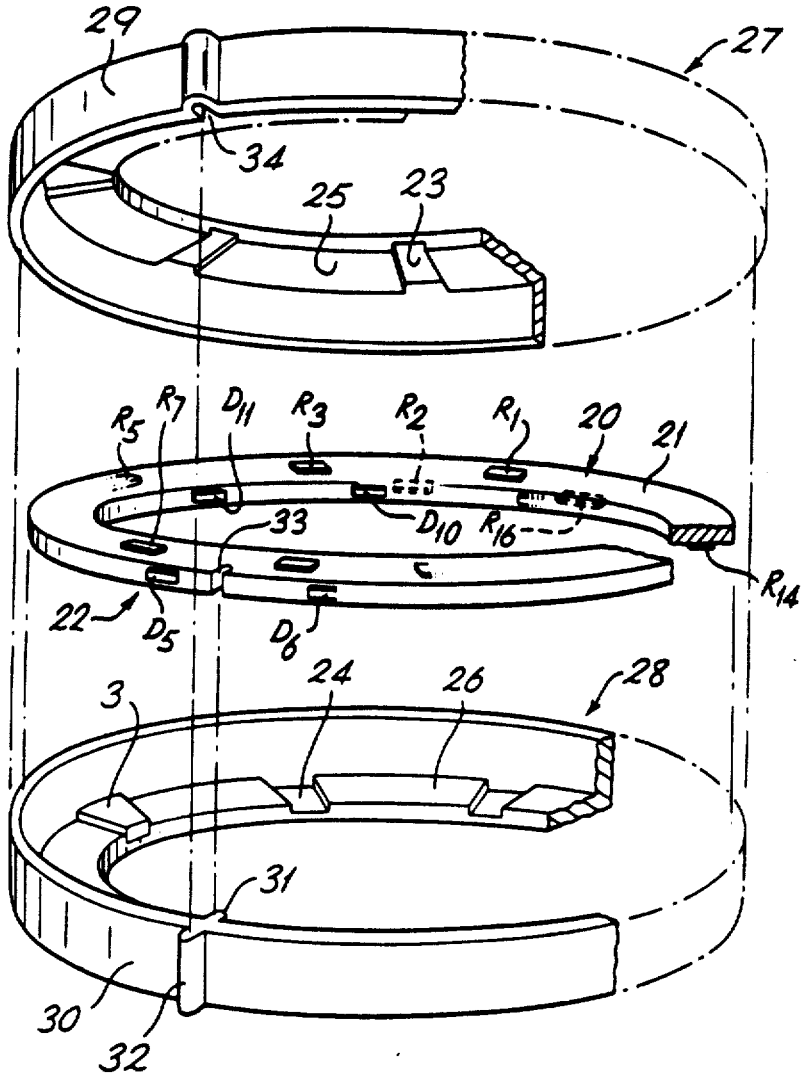
FIG. 6 is a diagrammatic opened perspective view of another load cell.

The method of engagement of walls 29, 30 allows limited relative axial movement between members 27, 28 when the device as a whole is subjected to axial load in use, thus allowing the opposed axial forces transmitted by projections 2, 3 to distort ring 20 elastically just as ring 1 was distorted in FIGS. 1 and 2. One advantage of the construction of FIG. 6 is that the ring itself is clearly a far simpler and cheaper item, with more predictable bending properties than the more complex construction of FIGS. 1 and 2. Another advantage is that while the number of projections associated with the ring of FIGS. 1 and 2 is fixed and cannot change, ring 20 of FIG. 6 can be used not only with the particular combination of members 27, 28 shown, but also with other combinations of similar diameter but containing different numbers of projections 2, 3.

Figure 3:
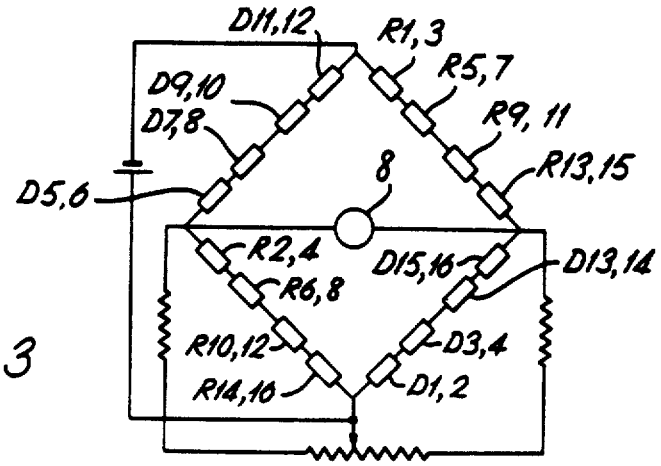
FIG. 3 is a circuit diagram.

A measure of the load to which the ring is subjected is derived from the output of resistance strain gauges bonded to the ring, these gauges recording the resultant strain of that part of the surface of the ring to which they are attached. Thirty-two such gauges were attached to the ring shown in FIG. 1 and their positions are indicated in FIG. 2. Gauges would be attached similarly to the ring 20 of FIG. 6 also if a similar number of projections were used. The sixteen gauges referenced R1 to R16 are the "active" gauges from whose signals (that is to say, change of resistance under strain) a measure of the applied force is derived, and each of these gauges is located to one of the axial faces 4, 5 at a point axially opposite to where a projection bears against the other face. These gauges, it will be appreciated, are thus mounted at the points where the ring may be expected to undergo greatest strain when distorted in the manner already described. The "passive" gauges, referenced D1 to D16, are bonded to the inner and outer peripheral faces 6, 7 of the ring and the purpose of their resultant output is to compensate for temperature variations around the ring and any distortion of the ring other than that caused by axial thrust. FIG. 3 shows how the electrical resistances provided by gauges R1 to R16 and D1 to D16 are combined and mounted in a simple electrical bridge network; the output of galvanometer 8 gives a measure of the applied load, in a manner that will be explained. FIG. 1 shows how the mounted gauges are protected by wound tape 9, and also shows a single cable 11 by which the leads to all the gauges are conducted to and from the ring. In FIG. 6 the gauges like the ring itself would be protected by the casing provided by members 27, 28.

Tests have revealed a very linear and repeatable relationship between applied load (measured in tonf, for example) and the deflection in radians of the galvanometer 8 due to the resultant bridge current.

Figure 4:
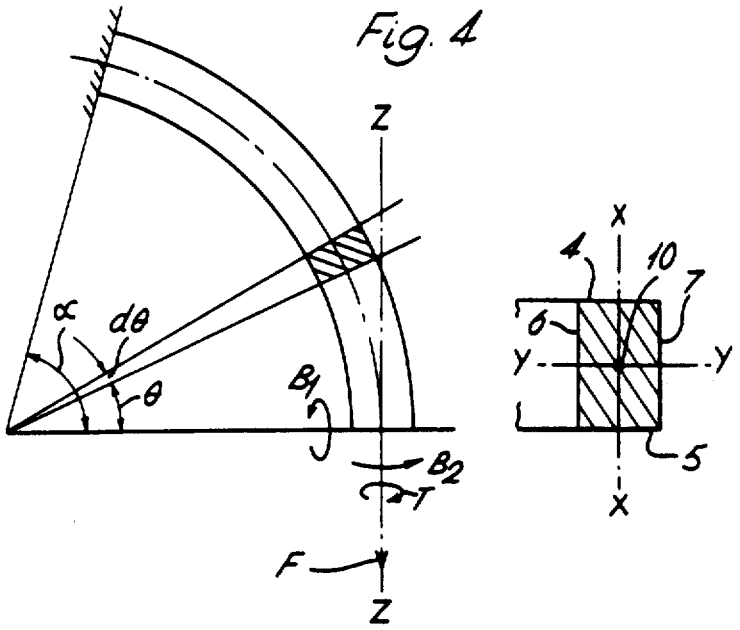
FIG. 4 is in two parts, comprising a mathematically-stylised plan view of part of a cell and a section, to illustrate load components acting upon such a section of the load cell.

A brief account of the theory behind the distortion of a ring may begin with a study of FIG. 4, where three axes X—X, Y—Y and Z—Z applicable to each transverse element of the ring are illustrated; they all pass through the geometrical centre 10 of the element and Y—Y is radial, Z—Z lies parallel to a tangent of the ring and X—X lies in the third orthogonal direction. When the ring is under axial load it may be assumed that the moments and forces existing in a section of the ring coinciding with one of projections 2, 3 will have the following components:

(i) a bending moment $B_1$ about axis Y'Y;
(ii) a shearing force S along axis X—X;
(iii) a bending moment $B_2$ about axis X—X;
(iv) a twisting moment T about axis Z—Z, and
(v) an axial force F along axis Z—Z. From these assumptions it may be deduced that in a similar element of the ring, but separated by a sector angle $\theta$ from the radial plane containing the nearest projection, there will be six load components. Of these a bending moment about the Y-axis, a twisting moment about the Z-axis and a shearing force along the X-axis are due to items (i) and (ii) above.

Figure 5:
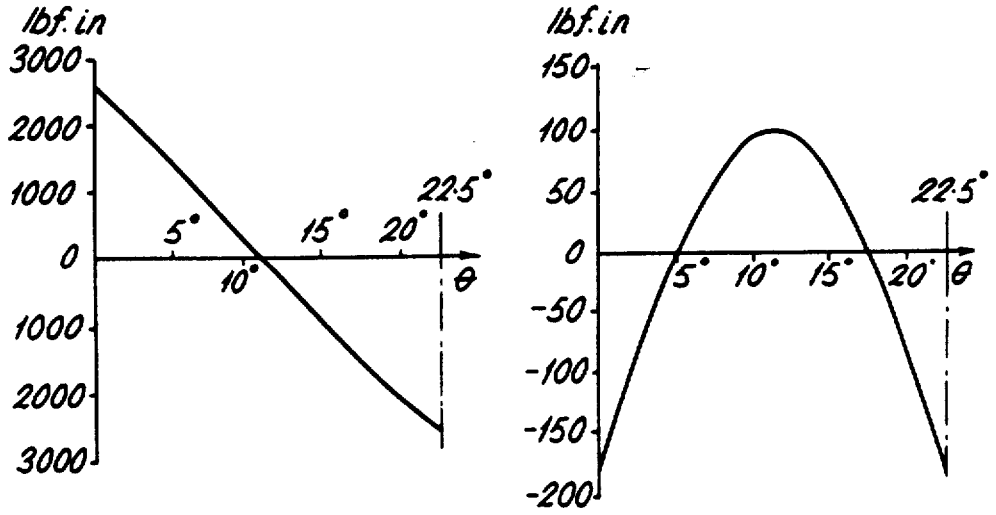
FIG. 5 shows two graphs illustrating the bending and twisting moments generated upon a representative part of a cell during test.

FIG. 5 shows a typical distribution of Y-axis bending moment and Z-axis twisting moment in elements along an arc of ring, of total sector angle $\alpha$ extending from the location of a projection on one axial face to the location of the nearest projection on the other face, $\theta$ being the angle that defines the location within that arc of each element under consideration. In FIG. 4, angle $\alpha$ is for clarity shown far greater than 22½°, the value it would have in FIG. 2. The effects of the other three components in each element, listed as items (iii) to (v) above, may be summarized thus: the bending moment $B_2$ tends to increase or decrease the radius of the ring, the torque T twists the section of the ring relative to the supports, and the thrust of traction of force F may be taken to act through centre 10 (FIG. 4).

The strain energy U stored in each arc of the ring may be represented as an integral, with respect to $\theta$ and between limits o and $\alpha$, of a quantity including functions of each of the six components for each element just described. For the ring shown in FIGS. 1 and 2 there are sixteen such arcs and the total output of the active strain gauges R, each located at a point of greatest strain (on the same radius as one of the supports, where $\theta$ equals 0) will be proportional to the total strain energy U in the arc concerned, so that the sum of the signals of gauges R will be proportional to the total applied load P, thus enabling that quantity to be found by solution of the equation:

$$D_e = \delta U / \delta P$$

where $D_e$ is the axial deflection of the ring under load, which is of course measurable.

Knowing the space available for such a load cell and the load-carrying capacity and stiffness required of it, it is possible, for instance by computer-processing of a stress analysis of the ring, to predict such design features as the optimum number and size of projections (2, 3) on either side of the ring, and the choice of other dimensions for the ring which will give greatest sensitivity.

We claim:

[1. A load-measuring device comprising a ring-shaped body, at least three circumferentially-spaced first axial projections presenting sectorially-aligned surfaces operatively mounted so that said surfaces engage a first of the two axial faces of said ring-shaped body;

at least three circumferentially-shaped second axial projections presenting sectorially-aligned surfaces operatively mounted so that said surfaces engage the second and opposite of said axial faces of said ring-shaped body at locations staggered relative to those of said first axial projection;

means to detect the strain imposed upon said ring-shaped body when said ring-shaped body is distorted elastically to sectorially-undulating shape by opposed axial loads applied to said ring-shaped body through said first and second axial projections.]

[2. A load-measuring device as claimed in claim 1 in which said first and second axial projections are integral with said ring-shaped body.]

[3. A load-measuring device according to claim 1 in which said first and second axial projections are bonded to said ring-shaped body.]

[4. A load-measuring device according to claim 1 including parts of said device other than said ring-shaped body on and by which the said axial projections are mounted and located.]

5. A load-measuring device according to claim [4] *11* including a two-part casing which encloses said ring-shaped body, and in which said other parts of said device are the said two parts of said casing.

6. A load-measuring device according to claim [1] *11* in which said means to measure said strains in said ring-shaped body comprise a first set of gauges mounted on said ring-shaped body to measure the predominantly tensile bending strain caused by said undulating distortion.

7. A load-measuring device according to claim 6, in which said first set of gauges are mounted on each of said axial faces of said ring-shaped body at points axially-opposite to where one of said projections bears against the opposite side axial face of said ring-shaped body in use.

8. A ring load-measuring device according to claim 6, in which said ring-shaped body presents radially-inner and radially-outer faces in addition to said axial faces, and in which said means to detect said distortion includes a second set of gauges that are attached to said radially-inner and radially-outer faces at locations circumferentially-staggered relative to those of said projections.

9. A load-measuring device according to claim 6 in which said gauges are of electrical resistance type so that the signal of a said gauge when it responds to said distortion corresponds to a change in the electrical resistance of said gauge.

10. A load-measuring device according to claim 9 including a bridge-type electrical circuit, and in which said gauges are arranged within said circuit and the output of said circuit provides an indication of the resultant of said opposed axial loads.

*11. A load-measuring device comprising a ring-shaped body,*

*at least three circumferentially-shaped first axial projections presenting sectorially-aligned surfaces operatively mounted so that said surfaces are movable relative to said ring-shaped body in a direction parallel to the axis of said body so as to engage a first of the two axial faces of said ring-shaped body;*

*at least three circumferentially-spaced second axial projections presenting sectorially-aligned surfaces operatively mounted so that said surfaces are movable relative to said ring-shaped body in a direction parallel to the axis of said body so as to engage the second and opposite of said axial faces of said ring-shaped body at locations staggered relative to those of said first axial projection;*

*means to detect the strain imposed upon said ring-shaped body when said ring-shaped body is distorted elastically to sectorially-undulating shape by opposed axial loads applied to said ring-shaped body through said first and second axial projections, said device further including parts of said device separated from said ring-shaped body on and by which the said axial projections are mounted and located.*

*12. A load-measuring device of ring-like form for interposition between two members to respond to a load urging those two members together, comprising:*

*at least 3 circumferentially-spaced first load-transmitting elements located to bear against one axial face of*

*said ring; at least 3 like second elements located to bear against the opposite axial face of said ring;*

*said locations of said first elements being circumferentially staggered relative to said locations of said second elements so that when said ring is interposed between said 2 members under load said members will bear in opposite axial directions against said ring by way of said first and second elements so as to distort said ring elastically to an undulating shape;*

*an array of strain-responsive gauges carried by said ring, said array being in two parts;*

*gauges within said first part being mounted upon said ring so that they measure the strains caused by the distortion of said ring; and*

*gauges within said second part being mounted on said ring to compensate for distortions of said ring other than those caused by said applied load, so that the output of said array of said gauges may provide an indication of said applied load unaffected by said distortions.*

*13. A load-measuring device according to claim 12 in which said gauges of said first part of said array are mounted on the axially-facing faces of said ring at locations axially-opposite to where one of said load transmitting elements bears against the opposite axially-facing face of said ring in use.*

*14. A load-measuring device according to claim 12 in which said gauges of said second part of said array are mounted on the radially-inward and radially-outward facing faces of said ring at locations circumferentially staggered relative to those said first and second load-transmitting elements.*

* * * * *